No. 712,243. Patented Oct. 28, 1902.
R. J. BEISE.
POULTRY DRINKING FOUNTAIN.
(Application filed Apr. 9, 1902.)
(No Model.)
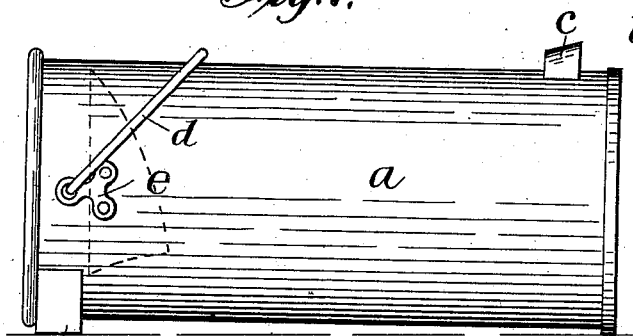
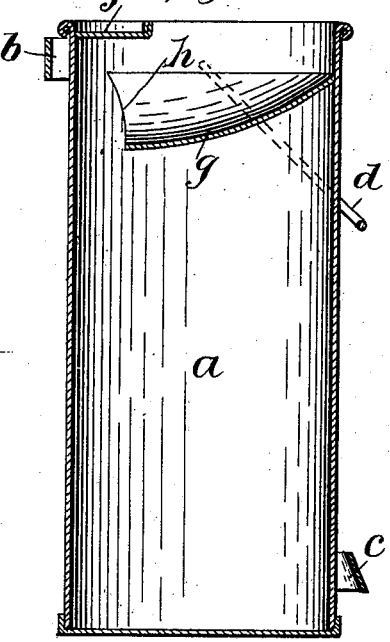
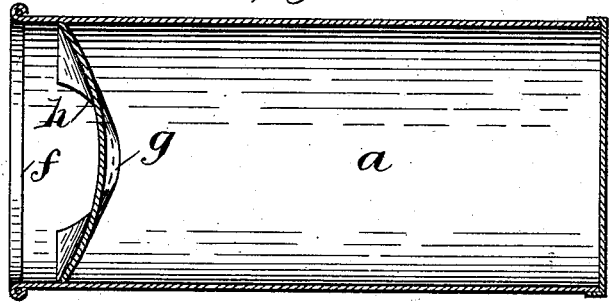
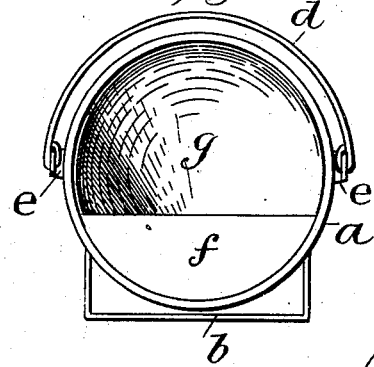
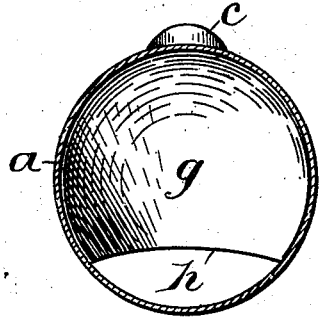
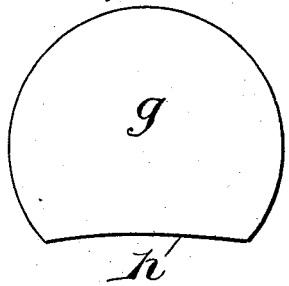
Witnesses
Geo. E. Frech.
E. R. Peck.
Inventor
Richard J. Beise.
By
Hubert Peck
Attorney

UNITED STATES PATENT OFFICE.

RICHARD J. BEISE, OF PINE ISLAND, MINNESOTA.

POULTRY DRINKING-FOUNTAIN.

SPECIFICATION forming part of Letters Patent No. 712,243, dated October 28, 1902.

Application filed April 9, 1902. Serial No. 102,101. (No model.)

*To all whom it may concern:*

Be it known that I, RICHARD J. BEISE, a citizen of the United States, residing at Pine Island, Goodhue county, Minnesota, have invented certain new and useful Improvements in Poultry Drinking-Fountains; and I do hereby declare the following to be a full, clear, and exact description of the invention, such as will enable others skilled in the art to which it appertains to make and use the same.

This invention relates to certain improvements in poultry drinking-fountains.

An object of the invention is to provide an improved poultry drinking-fountain formed or provided with an approximately funnel-shaped or dished partition designed to facilitate the operation of filling the fountain and also to reduce to a minimum the liability of the water spilling or splashing out during the operations of filling the fountain and of lowering the fountain to the horizontal position.

Another object of the invention is to provide certain improvements in details and arrangements whereby an exceedingly simple and effective drinking-fountain for poultry will be produced.

The invention consists in certain novel features in construction and in combinations and arrangements of parts, as more fully and particularly pointed out hereinafter.

Referring to the accompanying drawings, Figure 1 is a side elevation of the fountain in the normal horizontal position. Fig. 2 is a longitudinal central section of the same in the vertical position for filling. Fig. 3 is a front end elevation. Fig. 4 is a cross-section. Fig. 5 is a longitudinal section looking down, the tank in rear of the dished or funnel-like partition being broken away. Fig. 6 is a plan view of a blank from which the funnel-like partition can be formed.

In the drawings, $a$ is a usually-elongated cylindrical tank or receptacle closed except at the front end and preferably formed of galvanized sheet-iron or other suitable sheet metal. This tank is adapted to be filled and carried in an upright position, but when in use is adapted to rest in a lowered position, as nearly horizontal as possible, so as to be readily accessible to very small chickens or other fowl.

$b$ is a foot, bracket, or flat strip of metal rigidly secured across the front end of the lower or under side of the tank to rest on the ground and hold the tank against rolling. The ends of the elongated foot can be bent up and secured to the outer surface of the tank, as shown, thereby forming the angles or angle-feet at the under portion of the front end of the receptacle. The receptacle at its rear portion can rest on the ground. This arrangement of ground feet or rest permits the tank to rest in an approximately, if not actually, horizontal position close to the ground, for the purpose stated.

$c$ is a handle or rigid handhold at the top of the rear portion of the receptacle for use in raising or lowering the receptacle.

$d$ is a swinging bail or handle by which the receptacle can be lifted or carried in the upright position and held while being lowered or tilted to the horizontal position.

When the tank is in the horizontal position, the bail can extend rearwardly and rest on the tank, as shown in Fig. 1. The bail is loosely confined to the ears $e$, rigidly secured to diametrically opposite exterior portions of the tank and located a distance in rear of the front end of the tank to avoid projections at the front end of tank, but particularly to enable the operator to easily lower the tank to the horizontal position.

$f$ is the comparatively low front dam, curb, or partition closing the lower portion of the front end of the receptacle and forming the front wall of the readily accessible or exposed front drinking-space.

$g$ is a dished or funnel-like partition located in rear of the front curb $f$ and entirely closing the receptacle, except for a comparatively small or narrow elliptical opening $h$ behind said front curb and in a plane below the horizontal plane including the top edge of said front curb. Said partition or wall $g$ is dished, concaved, or otherwise formed to taper or incline throughout its outer or front surface toward and to said opening $h$. The said partition $g$ can be formed from a sheet-metal blank about as shown in Fig. 6 and of greater diameter than the internal diameter of the tank and with the rounded notch cut therein. This blank is then dished or concaved, so that it will incline from its surrounding edge toward and to said notch. The partition thus formed is then inserted in the tank, with the notch behind said front curb, and is soldered or otherwise rigidly secured around its edge to the inner surface of the tank, thereby forming the elliptical opening $h$ behind said front curb. Said opening is of the greatest width at the center and gradually reduces in width in opposite directions to the ends. The partition being thus concaved and dished inwardly forms the enlarged drinking-space in rear of the front curb, so that the water therein is readily accessible to the fowl and plenty of room is afforded for drinking purposes, which is not the case where closely-arranged flat partitions are employed. This dished partition is also so formed as to constitute what might be termed a "funnel" for filling purposes. When the tank is in the upright position, said partition inclines and tapers downwardly and inwardly from its upper surrounding edge to the edge of said notch forming the opening, which itself curves from its upper ends downwardly to its central portion. In filling the tank the water is poured or discharged onto said partition and by reason of the formation thereof is deflected downwardly and inwardly to the center or widest part of the opening $h$ at a distance below the front curb, and splashing and spilling over is avoided, and the tank can be very rapidly filled. Also the said partition is so formed as to avoid spilling or splashing over when the tank is lowered to the horizontal position. By reason of the peculiar shape of the opening $h$ the water cannot run out when the tank is in its horizontal position should the same be tilted laterally. Hence it is not necessary that the tank be placed with the bottom foot or bracket level or horizontal.

It is evident that various changes might be resorted to without departing from the spirit and scope of my invention. Hence I do not wish to limit myself to the exact showing.

Having thus fully described my invention, what I claim is—

A drinking-fountain comprising the tank having a curb at its front end, and the inwardly-dished funnel-like partition behind the curb and forming the enlarged drinking-space between the curb and partition, said partition having an edge notch forming an opening behind the curb, said partition inclining or concaving from its surrounding edge inwardly to said opening, whereby the inner face of the partition is convex and the outer face thereof concave, for the purposes set forth.

In testimony whereof I affix my signature in presence of two witnesses.

RICHARD J. BEISE.

Witnesses:
  R. N. IRISH,
  LOOMIS F. IRISH.